United States Patent Office 3,006,904
Patented Oct. 31, 1961

---

3,006,904
POLYMERIZATION OF MONOOLEFINS WITH ALCOHOL-CONTAINING CATALYST
Michael Jahrstorfer, Heidelberg, and Hermann Spaenig and August Weickmann, Ludwigshafen (Rhine), Germany, assignors to Badische Anilin- & Soda-Fabrik Aktiengesellschaft, Ludwigshafen (Rhine), Rhineland-Pfalz, Bundesrepublik, Germany
No Drawing. Filed Apr. 2, 1957, Ser. No. 650,077
Claims priority, application Germany Apr. 6, 1956
2 Claims. (Cl. 260—93.7)

This invention relates to new polymerization catalysts and to a process for the production of polymers with the aid of complex catalysts. In particular, the present invention relates to the production of linear polyethylene with the aid of a new complex catalyst.

The polymerization of olefinically-unsaturated compounds, such as ethylene, propylene or styrene, with the aid of organo-metallic catalysts is known. There are thereby formed polymers which are characterized by a special linear molecular structure and a high crystallinity. The relatively troublesome and expensive production of the organo-metallic catalysts is a disadvantage of the said method.

Among the objects of the present invention therefore is included the provision of new catalysts which are suitable for the polymerization of olefinically-unsaturated compounds and can be prepared in a simple manner. A further object of the invention is to provide a method by means of which linear polymers can be prepared from olefinically-unsaturated compounds. Other objects and advantages of the invention will be evident from the following detailed description of the invention.

According to this invention we have found that technically valuable polymers are obtained by polymerizing olefinically-unsaturated compounds in the presence of a catalyst formed by the reaction of a metal of the 2nd to 4th groups of the periodic system with a halide of a metal of the 4th to 6th groups of the periodic system and a compound containing a hydroxyl group.

The catalysts used in the said method are obtained for example by bringing together finely divided aluminum, titanium tetrachloride and an alcohol in the presence of an indifferent liquid diluent. As indifferent diluents there come into question above all saturated aliphatic hydrocarbons and hydroaromatic hydrocarbons, as for example saturated aliphatic hydrocarbons from hexane through heavy gasoline up to paraffin oil, and also cyclohexane, hexahydrotoluene and hexahydroxylene. The said substances react vigorously with the evolution of heat so that for the control of the reaction it is preferable to prepare a mixture of only two of the three components and to add the third component a little at a time.

One example of a suitable procedure consists of allowing alcohol to drip into a moderately cooled suspension of finely powdered aluminum in a mixture of a titanium halide and an indifferent solvent. An exothermic reaction thereby takes place which is carried to completion by heating, for example to the boiling temperature of the solvent. However, the alcohol may also first be added to a cooled solution or suspension of the titanium halide and then aluminum powder introduced into the resultant mixture containing hydrogen halide. In this case either a spontaneous reaction takes place or the reaction is initiated and carried to completion by heating. A further possibility for obtaining complexes which are active in polymerizations consists in bringing a suspension of aluminum in a liquid mixture of an alcohol and an indifferent liquid diluent into reaction with a titanium halide which may be diluted or undiluted. The procedure may also be that the aluminum is first introduced into an indifferent diluent and then the other two components are added simultaneously but separately.

The reaction for the formation of the catalysts takes place as a rule at room temperature and then leads by reason of the heat set free to an increase in the temperature of the reaction medium. The temperature is preferably kept between 60° and 100° C. by cooling or heating, these being merely the limits for the optimum conditions since the reaction will also take place outside these limits, for example at 10° to 200° C.

The constitution of the catalytically-active products that are formed is not known, and their composition varies according to the proportions in which the participating reaction components are used. Very good catalysts are obtained for example by using 1 mol of compound containing a hydroxyl group to 1 mol of titanium tetrachloride and 1 gram atom of aluminum. The ratio of the said reaction components may, however, be varied within wide limits. It is possible for example to use only 0.75 mol of titanium tetrachloride or another halide of the 4th to 6th groups to 1 mol of a compound containing a hydroxyl group. There is no upper limit for the amount of these halides so that even 2, 3 or 4 mols of the halides may be used with good effect. The ratio between the compound containing a hydroxyl group and aluminum or other metal of the 2nd to 4th groups is also variable. A suitable lower limit for 1 mol of the compound containing a hydroxyl group lies at 0.75 gram atom of these metals. There is no critical upper limit, so that it is possible to work also with 2, 3 or 4 gram atoms of these metals. The introduction of more metal than the reaction requires is not disadvantageous as regards the polymerizing action of the products formed.

By the reaction of the initial materials for the catalyst there are formed solid masses which can be separated from the diluent by filtration or centrifuging. Since the dry reaction products often smoulder in the air in a manner similar to Raney-nickel, and are moreover sensitive to moisture, it is preferable to store them beneath an indifferent anhydrous solvent. The complex catalysts are usually obtained in powder form. Before use they may be brought to a state of extremely fine division in an oscillating mill. It is not necessary previously to filter off the catalysts by suction and wash them, but the pasty reaction mixture obtained can be directly comminuted. For the polymerization the catalyst suspension is preferably brought to an about 0.1 to 1% dilution by the addition of indifferent liquids, as for example octane, toluene or methyl cyclohexane. It is, however, possible to use minor or major amounts of catalyst.

Instead of titanium tetrachloride there may also be used other halides of titanium or halides of other metals of the 4th to 6th groups of the periodic system. The aluminum or other metal of the 2nd to 4th groups of the periodic system is preferably used in the form of granules or chips, but more preferably in a dust-fine division.

Suitable compounds containing hydroxyl groups are above all aliphatic alcohols, such as methanol, ethanol, isopropanol, propanol, butanols, pentanols and hexanols, as well as cycloaliphatic or araliphatic alcohols; phenols and other substances containing hydroxyl groups may also be used in the process.

Among the monomers which may be polymerized according to this invention, ethylene is of special interest. The polymerization of gaseous monomers is preferably carried out at increased pressure, preferably at pressures between 1 and 50 atmospheres. Obviously higher pressures may also be used but the use of higher pressures is usually unnecessary.

For the polymerization of gaseous monomers it is advantageous that the catalysts according to this invention can be applied to porous carriers. The activity of the complex catalysts can be modified by the addition of metal halides, especially Friedel-Crafts catalysts.

Favorable polymerization temperatures lie between about 50° and about 200° C., preferably at about 100° to 130° C.

The polymers obtained, which have a linear molecular structure and a crystalline structure, may be separated from residues of catalyst by treatment with acids, for example with alcoholic hydrochloric acid or with aqueous oxalic acid in the presence of an emulsifier. They are suitable for the production of shaped articles, films and the like.

The following examples will further illustrate this invention but the invention is not restricted to these examples. The parts specified in the examples are parts by weight.

*Example 1*

27 parts of dust-fine aluminum are suspended in a solution of 190 parts of titanium tetrachloride in 350 parts of normal octane. While excluding moisture, 46 parts of dry ethyl alcohol are allowed to drip in in such a manner while cooling moderately and stirring that the reaction temperature amounts to about 25° to 30° C. Stirring is continued and the continuance of the reaction is ensured by temporary interruption of the external cooling, the internal temperature thereby being allowed to rise gradually to 60° to 70° C. At this stage there commences the formation of a brown complex compound the amount of which rapidly increases by subsequent heating on a waterbath. The reaction paste is further heated for 12 hours at a bath temperature of about 80° to 85° C., and then ground in the cooled state in an oscillating mill for some hours. The ground material is then diluted with 1,017 parts of dry octane. 40 parts of the resultant catalyst suspension are diluted with 315 parts of octane, introduced into a shaking autoclave and at 100° C. placed under a pressure of 40 atmospheres of ethylene. Ethylene is subsequently forced in until the pressure no longer decreases. After cooling, the polymer, which is in the form of a solid cake, is taken out of the autoclave, triturated with ethyl alcohol, filtered by suction, then heated with an aqueous alcoholic hydrochloric acid, again filtered by suction, washed free from acid and dried. 220 parts of a white polyethylene are obtained. It is soluble in toluene, xylene and methylcyclohexane and has a softening point of 136° C. and a molecular weight of 145,000 determined by the method of Überreiter.

*Example 2*

80 parts of the catalyst suspension obtained according to Example 1 are diluted with 1,330 parts of normal octane, 8.6 parts of titanium chloride are added and the whole heated at 100° C. under 40 atmospheres ethylene pressure. Subsequent forcing in of ethylene is continued as long as the product is capable of being stirred. The product removed from the autoclave is a pale-colored readily friable cake which is purified as described in Example 1. The yield of polymer amounts to 477 parts. It is soluble in toluene, xylene and methylcyclohexane, has a softening point of 131° C. and a molecular weight of 68,000, determined by the method of Überreiter.

*Example 3*

A catalyst is prepared as in Example 1, but the reaction temperature, by appropriate cooling, is allowed to rise only to 40° C. and after the reaction has ceased the whole is stirred for about 15 hours without further supply of heat. The product is then ground in an oscillating mill and diluted with 1,017 parts of octane.

20 parts of this catalyst suspension are introduced into an autoclave, 2.15 parts of titanium tetrachloride are added, the whole diluted with 333 parts of octane and heated at 100° C. under 200 atmospheres ethylene pressure until the pressure remains constant. After the usual purification, 221 parts of polyethylene are obtained; it is soluble in the solvents specified in Examples 1 and 2 and softens at 132° C. It has a molecular weight of 80,000 by the method of Überreiter.

*Example 4*

A suspension of 27 parts of dust-fine aluminum in a solution of 190 parts of titanium tetrachloride in 385 parts of methylcyclohexane is prepared, 46 parts of dry ethyl alcohol are dripped in at 20° to 33° C. and the whole heated on the waterbath in a vessel provided with a reflux condenser. At 60° to 70° C. such a vigorous reaction sets in that reflux takes place. When the reaction has subsided, the whole is heated for another 4 hours on the waterbath at an internal temperature of about 90° C. The dark brown reaction paste is then ground and diluted with 1,017 parts of octane.

39 parts of the suspension are mixed with 347 parts of methylcyclohexane and 4.3 parts of titanium tetrachloride and treated in a shaking autoclave at 100° C. with ethylene under 20 atmospheres pressure until the pressure remains constant. 207 parts of a white polymer are obtained having the softening point 132° C. and a molecular weight of 40,000 according to Überreiter.

*Example 5*

A solution of 46 parts of absolute alcohol in 350 parts of normal octane is prepared and 27 parts of dust-fine aluminum are suspended therein. Then, with moderate external cooling, 190 parts of titanium tetrachloride are dripped in. Reaction sets in at once and is kept within moderate limits by regulating the speed of dripping. When the reaction, which proceeds with evolution of gas, has ceased, the remainder of the titanium tetrachloride not yet added is allowed to flow in and the whole stirred for another 12 hours at room temperature. The reaction paste is ground and diluted with 1,017 parts of normal octane. 80 parts of the suspension are mixed with 8.6 parts of titanium tetrachloride and 1,330 parts of normal octane. The mixture is heated to 100° C. in a stirring autoclave and ethylene is forced in at 40 atmospheres pressure until the pressure remains constant.

The product from the autoclave is purified in the way described in Example 1. There are obtained 741 parts of polyethylene with the melting point 133° C. and a molecular weight of 62,000 according to the method of Überreiter.

*Example 6*

120 parts of isopropyl alcohol are dripped during the course of an hour with moderate cooling into a suspension of 54 parts of aluminum powder in a solution of 380 parts of titanium tetrachloride in 560 parts of octane. The reaction temperature thereby rises to about 30° C. The whole is then heated on the waterbath until the evolution of gas ceases and then for another 6 hours under reflux. The reaction product is ground in an oscillating mill and finally diluted with 2,020 parts of octane. The catalyst suspension thus formed is introduced with 172 parts of titanium tetrachloride and 53,000 parts of octane into a stirring autoclave, heated to 140° C. and ethylene forced in at 20 atmospheres pressure while stirring. 26,000 parts of ethylene are absorbed. The contents of the autoclave are then no longer capable of being stirred and the reaction must be discontinued. The product from the autoclave is a viscous mass which by dissolution in xylene and reprecipitation becomes powdery and can then be purified in the usual way. The polyethylene thus obtained melts at 134.5° C. and has a molecular weight of 360,000 according to the method of Überreiter.

*Example 7*

A suspension of 54 parts of aluminum powder in 720 parts of octane is introduced into a vessel provided with stirring means. With moderate external cooling, there are added simultaneously while stirring during the course of 75 minutes, 92 parts of dry ethyl alcohol and 380 parts of titanium chloride, whereby the internal temperature rises to about 31° C. The reaction which then commences is controlled by periodic cooling so that the reaction temperature does not rise above 70° C. After the reaction has subsided the internal temperature is raised to 90° C. and kept constant for 15 hours.

30 parts of the catalyst suspension thus prepared are diluted with 360 parts of octane. Ethylene is then led in at a pressure of 20 atmospheres. At 130° C., about 100 parts of ethylene are absorbed. 94 parts of polyethylene of the molecular weight 82,000 according to Überreiter are obtained.

Example 8

92 parts of dry ethyl alcohol are dripped during the course of 50 minutes while stirring and cooling into a mixture of 720 parts of octane, 380 parts of titanium tetrachloride, 54 parts of aluminum and 100 parts of kieselguhr. With further cooling, the internal temperature gradually rises to 43° C. The whole is then heated to 90° C. and kept at this temperature for 16 hours. In the following polymerization, 26,000 parts of ethylene are consumed at 148° C. 21,000 parts of polyethylene are formed having the molecular weight 73,000 according to Überreiter.

Example 9

92 parts of 92% ethyl alcohol are allowed to drip during the course of half an hour while stirring and cooling into a mixture of 720 parts of octane, 380 parts of titanium tetrachloride and 54 parts of aluminum powder. After discontinuing the cooling, a more vigorous reaction gradually sets in. As soon as the main reaction has subsided, the whole is heated for another 4 hours on the boiling waterbath. Then the catalyst is ground in an oscillating mill. After standing for 18 days with exclusion of moisture, the catalyst has not lost its activity. It is introduced with 53,000 parts of octane and 50 parts of titanium chloride into a stirring vessel. Ethylene is then forced in at a pressure of 20 atmospheres and polymerized at 130° C. until a highly viscous mass has been formed. After the usual working up, 25,000 parts of a white polymer permeated by fibers are obtained with an average molecular weight of 80,000 according to Überreiter.

Example 10

108 parts of finely powdered aluminum and 380 parts of titanium tetrachloride are added to 720 parts of octane. 92 parts of dry ethyl alcohol are added during 75 minutes while stirring, the internal temperature thereby rising to about 50° C. The reaction mixture is then gradually brought to 90° C. and stirred at this temperature for 17 hours.

The catalyst is introduced with 55,000 parts of octane into a stirring vessel and absorbs 16,900 parts of ethylene at 137° C. and 20 atmospheres. By working up, 13,000 parts of polyethylene are obtained with a molecular weight of 125,000.

Example 11

92 parts of dry ethyl alcohol are added during the course of 1½ hours while stirring and cooling to a mixture of 540 parts of octane, 316 parts of titanium tetrachloride and 54 parts of aluminum powder. The internal temperature thereby rises to 29° C. During further stirring and cooling for 1½ hours, slow reaction takes place with slight increase in temperature to about 35° C. The reaction is carried to completion by heating and the product is finally heated for 18 hours at 90° C.

With this catalyst, which is diluted with 55,000 parts of octane, ethylene is polymerized at 134° C. and under a pressure of 20 atmospheres. By working up, 13,200 parts of polyethylene of the molecular weight 84,000 according to Überreiter are obtained.

Example 12

2,160 parts of octane are mixed with 380 parts of titanium tetrachloride and 54 parts of aluminum powder and then while stirring and cooling 92 parts of dry ethyl alcohol are added. The whole is allowed to react while cooling, the internal temperature not being allowed to rise above 37° C. during the course of 2½ hours. The whole is then heated to 90° C. within 2 hours and kept at this temperature for 10 hours.

With this catalyst, after the addition of 55,000 parts of octane, 16,000 parts of polyethylene can be prepared with the molecular weight 76,000 according to Überreiter, under the usual conditions.

Example 13

3,600 parts of octane are mixed with 342 parts of titanium tetrachloride and 54 parts of aluminum powder. 92 parts of dry ethyl alcohol are added while stirring and cooling. The internal temperature is kept at 38° C. for 2 hours by further cooling. Then it is heated to 90° C. and kept at this temperature for 12 hours.

This catalyst absorbs 21,400 parts of ethylene at 146° C. and 20 atmospheres. 19,000 parts of polyethylene are obtained with a molecular weight of 100,000 according to Überreiter.

Example 14

54 parts of aluminum powder are suspended in a solution of 380 parts of titanium tetrachloride in 640 parts of dimethylcyclohexane. To this mixture 92 parts of dry ethyl alcohol are added while stirring and cooling. When cooling is discontinued, the internal temperature rises spontaneously from about 30° to 115° C. The mixture is then heated for 7 hours at 126° C. under reflux.

The reaction product is diluted with 55,000 parts of dimethylcyclohexane and heated under 20 atmospheres ethylene pressure until the polymerization has been initiated. About 22,000 parts of ethylene are absorbed at 128° to 130° C. The polymer is then worked up in the usual way. 15,000 parts of a white polymer readily soluble in toluene are obtained; it has a molecular weight of 80,000 according to Überreiter.

Example 15

92 parts of dry ethyl alcohol are added to a mixture of 570 parts of titanium tetrachloride, 54 parts of aluminum powder and 800 parts of dimethylcyclohexane at an internal temperature of 23° to 28° C. The internal temperature is then allowed to rise gradually to 70° to 75° C. and the reaction mixture is stirred for 16 hours at 90° C. Then, after the brown complex compound has settled out, the supernatant liquid is decanted off, whereupon it is stirred twice, each time with 1,000 parts of hot dimethylcyclohexane and decanted each time. The complex compound thus washed is diluted with 60,000 parts of dimethyl cyclohexane and heated under an ethylene pressure of 20 atmospheres. When, in the course of half an hour, the internal temperature of 110° C. has been reached, the polymerization initiates and proceeds without further supply of heat and with slight evolution of heat at about 115° C. 29,000 parts of ethylene are absorbed. The product when worked up yields 26,400 parts of a white polymer of the molecular weight 45,000 according to Überreiter.

Example 16

144 parts of normal butanol are gradually introduced into a suspension of 54 parts of aluminum powder in a solution of 380 parts of titanium tetrachloride in 720 parts of octane. The reaction mixture is then heated to 90°

C. within 3 hours while stirring. It is then further stirred at 100° C. for 7 hours.

The catalyst is introduced with 55,000 parts of octane into a stirring vessel and then absorbs 14,000 parts of ethylene at 130° C. and 20 atmospheres pressure. The working up of the reaction product, carried out in the usual way, yields 12,200 parts of a white powdery polyethylene of the molecular weight 58,000 according to Überreiter.

Example 17

By using 204 parts of normal hexyl alcohol instead of normal butanol and proceeding otherwise in the same way as in Example 16, a catalyst of similar good cavity is obtained. After adding 55,000 parts of octane and 100 parts of titanium tetrachloride to the catalyst, it is used for polymerizing ethylene at 138° C. The polymerization product is fibrous and can be worked up in the usual way. 8,000 parts of polyethylene are obtained of the molecular weight 125,000 according to Überreiter.

Example 18

55,000 parts of octane are introduced into a polymerization vessel. While stirring, 361 parts of titanium tetrachloride and 54 parts of aluminum powder are added. Without cooling, there are then gradually added 92 parts of dry ethyl alcohol. The whole is then heated within 3½ hours to 93° C. and then for another 15 hours at 95° C.

After previous rinsing with dry nitrogen, 12 atmospheres of ethylene are forced in, and the polymerization is initiated by raising the temperature. Ethylene is forced in at a pressure of 20 atmospheres until no more is absorbed. By working up there are obtained 10,000 parts of polyethylene of the molecular weight 158,000 according to Überreiter.

Example 19

A mixture of 1,440 parts of octane, 180.5 parts of titanium tetrachloride, 125 parts of kieselguhr and 27 parts of aluminum powder is stirred and cooled to about 20° to 30° C. and 46 parts of dry ethyl alcohol are added. The whole is allowed to react at about 36° C., heated slowly to 90° C. as soon as the temperature begins to fall again spontaneously, and kept at the said temperature for 11 hours. The catalyst is diluted with 25,000 parts of octane and then ethylene is forced in and the whole heated until polymerisation has been initiated. Then the addition of fresh solvent is commenced in order to keep the mixture in a state capable of being stirred as the polymerization proceeds. The supply of octane is regulated so that about 100 parts enter per minute during the polymerization. 30,000 parts of octane are pumped in at 140° C. At the same time ethylene is forced in at 20 atmospheres. After 15 hours the absorption of ethylene has not come to a standstill but is discontinued. 24,400 parts of ethylene are thus absorbed. The working up of the reaction product yields 18,000 parts of polyethylene with a molecular weight of 98,000 according to Überreiter.

Example 20

92 parts of ethyl alcohol are allowed to drip at 25° C. to 30° C. into a solution of 380 parts of titanium tetrachloride in 702 parts of octane and the whole heated until the evolution of hydrogen chloride has ceased. There is then present a hot solution of trichlormonoethoxy titanium in octane. 54 parts of aluminum powder are then added and 30 parts of hydrogen chloride are led in at 80° C. Even during the introduction of the hydrogen chloride there is observed the formation of the brown complex compound; the formation of which is completed by heating for about 4 hours at 100° C.

The catalyst is introduced into a stirring vessel, diluted with 55,000 parts of pure octane, the whole heated under nitrogen to 140° C. and, after previous decompression, ethylene is forced in at 20 atmospheres pressure until about 15,000 parts of ethylene in all have been absorbed. The polymerization is then discontinued and the whole cooled to about 60° C.

In order to remove the catalyst, 4,000 parts of ethyl alcohol are added, the whole stirred intensely for 2 hours, the polymer rapidly filtered by suction and the resulting mass washed with octane until this runs away colorless. Then the product is treated with steam in the presence of oxalic acid and a wetting agent in order to recover the octane. The product is then filtered off by suction, washed and dried. The polyethylene (14,000 parts) obtainable in this way has a molecular weight of 183,000 according to Überreiter and an ash content of 0.2%.

Example 21

4.6 parts of dry ethyl alcohol dissolved in 50 parts of octane are allowed to drip into a solution of 19.1 parts of vanadium tetrachloride in 100 parts of octane in the course of about 10 minutes. Evolution of hydrogen chloride takes place and is carried to completion by heating. At 80° C. there are added 2.7 parts of aluminum powder and 1.8 parts of hydrogen chloride are led into the dark orange colored suspension at 80° C. The whole is then further stirred in a waterbath at 100° C. (bath temperature) for 4 hours. A violet colored powdery substance is formed under these conditions.

10 parts of the catalyst suspension thus formed are introduced under dry nitrogen into a pressure vessel simultaneously with 40 parts of octane. Ethylene is then forced in under a pressure of 35 atmospheres and heated at 150° C. while shaking until the pressure remains constant. The product from the autoclave contains about 1 part of fibrous polyethylene. The polymer rendered substantially ash-free by treatment with ethyl alcohol and hydrochloric acid is soluble well in toluene, xylene, methylcyclohexane and the like. After dissolution in and precipitation from xylene, it has a molecular weight of 156,000 according to Überreiter.

Example 22

130.8 parts of zinc dust are kept in suspension in 1,000 parts of octane by intense stirring. After adding 92 parts of dry ethyl alcohol and then heating on the water-bath at 80° C. (bath temperature), the dripping in of 380 parts of titanium tetrachloride is begun. Reaction immediately sets in with evolution of gas and progresses in proportion to the amount of titanium tetrachloride introduced. While about the first quarter of the titanium tetrachloride is dripping in, the contents of the flask, which were originally grey, become deep violet in color; at the same time it increasingly loses its mobility. Upon further addition of the remaining titanium tetrachloride, the viscous reaction mixture gradually becomes a lumpy solid and finally disintegrates to a brown powder. The total duration of the reaction amounts to about 3 to 4 hours. The whole is then heated further for 5 hours at a bath temperature at 90° C. and allowed to cool.

The powdery reaction product thus obtained is a good catalyst for the production of oily to waxy polymerization products of propylene.

25 parts of the catalyst suspension are introduced into a shaking autoclave while excluding moisture. The catalyst is allowed to settle, the octane decanted off as much as possible, the autoclave closed, 195 parts of liquid propylene forced in and the whole heated to 150° C. The propylene pressure at first increases to 60 excess atmospheres and then falls rapidly to 2 excess atmospheres. After cooling the autoclave, the liquid product is filtered by suction from catalyst with the interposition of a cooling fall. 180 parts of a practically colorless oil are obtained of which 34 parts pass over at 30° to 110° C. at a pressure of 9 torr and the remainder at a temperature up to 200° C. at a pressure of 3 torr.

Isobutylene may be quantitatively polymerized to an oil of the same boiling range in the same way.

*Example 23*

92 parts of dry ethyl alcohol are allowed to drip at 25° to 30° C. into a mixture of 1,000 parts of paraffin oil, 54 parts of aluminum powder and 380 parts of titanium tetrachloride. The exothermic reaction is then allowed to proceed by itself, the internal temperature thereby rising to 97° C. Then the internal temperature is raised within ½ hour to 185° C. The said temperature is maintained until the evolution of gas which recommences has ceased, which is usually ¼ hour. After cooling, 20 parts of the black-brown paste are suspended in dry octane, introduced into a shaking autoclave and heated to 150° C. under an ethylene pressure. Working up of the reaction product yields 42 parts of a white polymer of the molecular weight 69,000. The polymer is of good solubility in toluene or xylene.

We claim:

1. A process for the production of polymers which comprises polymerizing an olefin selected from the group consisting of ethylene, propylene, and isobutylene in the presence of a catalyst which has been formed by the reaction of (*a*) a metal selected from the group consisting of aluminum and zinc, (*b*) a halide of a metal selected from the group consisting of titanium and vanadium, and (*c*) a saturated aliphatic monoalcohol containing up to 6 carbon atoms, the molar ratio of said metal *a* to said halide *b* varying between about 0.75:4 to 4:0.75, the amount of alcohol *c* present in the reaction mixture being from about 0.25 to about 1.33 mols for each mol of said metal *a* and from about 0.25 to about 1.33 mols for each mol of said halide *b*, said reaction taking place in the presence of a hydrocarbon diluent.

2. A process as in claim 1 wherein the metal is aluminum, the halide is titanium tetrachloride, and the alcohol is ethanol.

References Cited in the file of this patent

UNITED STATES PATENTS

| 2,833,755 | Coover | May 6, 1958 |

FOREIGN PATENTS

| 534,888 | Belgium | Jan. 31, 1955 |
| 874,215 | Germany | Apr. 20, 1953 |
| 1,136,178 | France | Dec. 22, 1956 |
| 1,137,459 | France | Jan. 14, 1957 |

UNITED STATES PATENT OFFICE
CERTIFICATE OF CORRECTION

Patent No. 3,006,904                      October 31, 1961

Michael Jahrstorfer et al.

It is hereby certified that error appears in the above numbered patent requiring correction and that the said Letters Patent should read as corrected below.

Column 7, line 14, for "cavity" read -- activity --.

Signed and sealed this 24th day of April 1962.

(SEAL)
Attest:
ESTON G. JOHNSON
Attesting Officer

DAVID L. LADD
Commissioner of Patents